(12) United States Patent
Basso et al.

(10) Patent No.: US 8,898,257 B1
(45) Date of Patent: Nov. 25, 2014

(54) MULTI-DEVICE COMPLEXITY BROKER

(75) Inventors: Andrea Basso, Marlboro, NJ (US); Lee Begeja, Gillette, NJ (US); David Gibbon, Lincroft, NJ (US); Zhu Liu, Marlboro, NJ (US); Bernard S. Renger, N Providence, NJ (US); Behzad Shahraray, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 416 days.

(21) Appl. No.: 12/254,524

(22) Filed: Oct. 20, 2008

(51) Int. Cl.
*G06F 15/16* (2006.01)

(52) U.S. Cl.
USPC ............ 709/219; 709/202; 709/217; 709/246

(58) Field of Classification Search
USPC ................. 709/202, 217–219, 230–231, 246; 705/10
See application file for complete search history.

(56) References Cited

U.S. PATENT DOCUMENTS

| | | | |
|---|---|---|---|
| 5,920,856 A | 7/1999 | Syeda-Mahmood | |
| 5,983,218 A | 11/1999 | Syeda-Mahmood | |
| 6,430,624 B1 * | 8/2002 | Jamtgaard et al. | 709/246 |
| 6,442,598 B1 * | 8/2002 | Wright et al. | 709/217 |
| 7,089,313 B2 * | 8/2006 | Lee et al. | 709/227 |
| 7,133,893 B2 | 11/2006 | Goldstein | |
| 8,131,646 B2 * | 3/2012 | Kocher et al. | 705/54 |
| 8,140,786 B2 * | 3/2012 | Bunte et al. | 711/161 |
| 2002/0120675 A1 | 8/2002 | Everett et al. | |
| 2003/0001880 A1 * | 1/2003 | Holtz et al. | 345/716 |
| 2003/0126136 A1 | 7/2003 | Omoigui | |
| 2004/0230572 A1 | 11/2004 | Omoigui | |
| 2005/0235047 A1 * | 10/2005 | Li et al. | 709/219 |
| 2005/0273790 A1 * | 12/2005 | Kearney et al. | 719/328 |
| 2006/0025135 A1 * | 2/2006 | Karaoguz et al. | 455/436 |
| 2007/0038610 A1 | 2/2007 | Omoigui | |
| 2007/0073837 A1 * | 3/2007 | Johnson-McCormick et al. | 709/217 |
| 2007/0081197 A1 | 4/2007 | Omoigui | |
| 2007/0088838 A1 | 4/2007 | Levkovitz et al. | |
| 2007/0147351 A1 * | 6/2007 | Dietrich et al. | 370/352 |
| 2007/0156770 A1 * | 7/2007 | Espelien | 707/200 |
| 2007/0162945 A1 * | 7/2007 | Mills | 725/119 |
| 2007/0169115 A1 * | 7/2007 | Ko et al. | 717/174 |
| 2007/0242819 A1 * | 10/2007 | Bozionek et al. | 379/207.12 |
| 2007/0250761 A1 * | 10/2007 | Bradley et al. | 715/500.1 |
| 2008/0016185 A1 | 1/2008 | Herberger et al. | 709/219 |
| 2008/0276102 A1 * | 11/2008 | MacKay et al. | 713/193 |
| 2009/0031381 A1 * | 1/2009 | Cohen et al. | 725/115 |
| 2009/0259515 A1 * | 10/2009 | Belimpasakis et al. | 705/10 |
| 2011/0149145 A1 * | 6/2011 | Ramos et al. | 348/441 |

* cited by examiner

*Primary Examiner* — Minh-Chau Nguyen
(74) *Attorney, Agent, or Firm* — Hoffmann & Baron, LLP

(57) ABSTRACT

The present invention provides for a brokering device adapted to manage multimedia information including an interface device having access to a network and a multimedia service provider. The interface device enables selection of multimedia information from the network and provides the selected multimedia information to a plurality of locations without requiring the user to specify a protocol associated with the multimedia information.

19 Claims, 2 Drawing Sheets

MULTI-DEVICE COMPLEXITY BROKER

BACKGROUND OF THE INVENTION

1. Field of the Invention

The present invention relates to a device for managing multimedia information. More particularly, the present invention relates to a brokering device for multimedia information.

2. Brief Description of the Related Art

The present invention relates to devices for playing and displaying multimedia information. Multimedia includes a combinations of text, audio, still images, animation, video, and interactive content. Multimedia information may be recorded, played, displayed, as part of a live performance or accessed by information content processing devices, such as computerized and electronic devices. For simplicity, the word "play" will be used to refer to play, record, display, or access in this application.

There are many devices and programs for playing multimedia information available. With the vast variety of devices and content there are also many protocols and formats used to manage the multimedia information. Managing of the multimedia information includes, but is not limited to playing, converting, sharing, storing, organizing, searching, streaming, downloading, and purchasing the content. Although many devices include hardware and software that organize, search, convert, and translate the protocols and formats, the process can be time consuming and may require a user to have knowledge of protocols.

Examples of technology available include, but are not limited to the following. A database that gathers and stores web content in a directory from a webcast center using a subscription service. (U.S. Pat. No. 6,442,598). A communication controller that establishes a connection between an electronic device with limited storage ability and a remote transport device. (U.S. Pat. No. 7,113,893). A multimedia database used in distributed network environments to do the following: select and coordinate information flow between multiple database sites and user sites, provide multimedia representations, create indexes of the multimedia information, derive a set of target multimedia database sites, and enable database queries descriptions, and final search results based on interactive dialogue between a user and multimedia database. (U.S. Pat. No. 593,218). A network server with a database containing text and multimedia information, a search agent, and a refining module. The network server that uses indexes of the database determined by user queries and distributes them to a database site, where the information from the database can be retrieved and updated. (U.S. Pat. No. 5,920,856).

Currently, many devices and software programs available enable conversion between media types. Examples of software that convert media include Digital Rapids®, Anystream Agility®, VLC, and FFmpeg.

Although the current devices and technology enable a person to do one or a combination of less than all of the following: play, convert, share, store, organize, search, and purchase media files, there is no universal device that hides the complexity of the actions using a diverse number of protocols. More specifically, people use multiple devices with multiple protocols and conversions between the different protocols can be difficult and time consuming for the user. Additionally, when searching for multimedia information, a user may not know the differences in quality or formats of multimedia information. Users also desire a device that chooses appropriate multimedia information for devices in the network and even determine which multimedia information is best for the specific devices.

Therefore, it would be advantageous to provide a device that provides the user with a simpler experience by decoupling the user from the technical aspects of the different protocols and is able to provide the user with basic options that optimize the compatibility, quality, cost, or other criteria based on the user and the devices on the network.

SUMMARY OF THE INVENTION

The present invention provides for a brokering device and a system for managing multimedia information.

The brokering device is adapted to manage multimedia information including an interface device having access to a network and a multimedia service provider. The interface device enables selection of multimedia information from the network and provides the selected multimedia information to a plurality of locations without requiring the user to specify a protocol associated with the multimedia information.

The system for managing multimedia information includes an interface device having access to a network and a multimedia service provider and a brokering device adapted to manage multimedia information. The brokering device is operatively configured to communicate with the interface device, the multimedia service provider, and the network. The interface device enables selection of multimedia information from the network, and the interface device provides the selected multimedia information to a plurality of locations without requiring a user to specify a protocol associated with the multimedia information.

Other objects and features of the present invention will become apparent from the following detailed description considered in conjunction with the accompanying drawings. It is to be understood, however, that the drawings are designed as an illustration only and not as a definition of the limits of the invention.

DETAILED DESCRIPTION OF THE INVENTION

Figure 1:
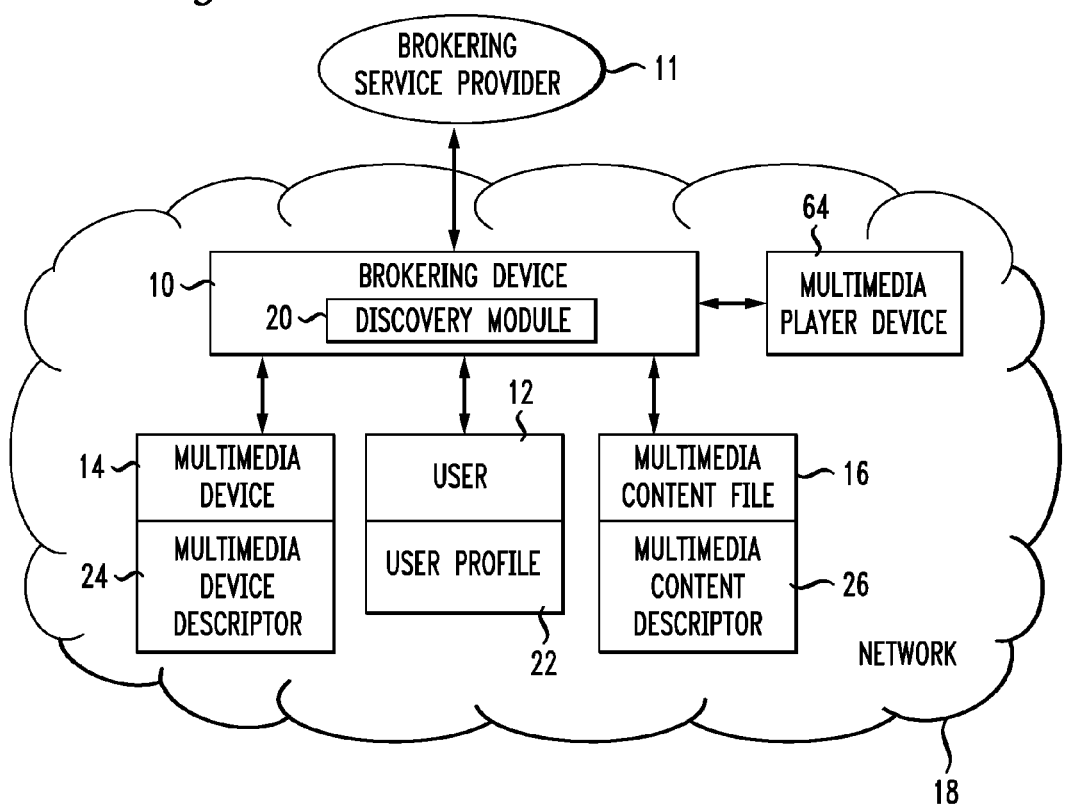
FIG. 1 depicts the basic elements of the complexity broker.

The present invention provides a brokering device that allows a user to easily play and manage multimedia files using a user friendly interface, referred to as an interface device or a user interface, that hides the complexity associated with translating and identifying protocols of multimedia information, software, hardware, and network information. The brokering device may be configured to operate externally using a brokering service provider or internally using a local area network or private network, such as a home with multiple computers or servers that enables the conversion within the local area network or private network.

The brokering device contains a dual layer method of brokering multimedia information using a service layer, also referred to as a user module; and a technical layer, also referred to as a function module. The service layer abstracts the discovery, control, delivery, and server functions in a user-friendly and intuitive way by presenting the user with an interface device, such as a web interface, a computer screen, a cellular phone screen, and a television screen. The objective is to enable a user to simply use the interface device to select or input information about multimedia information, such as an artist name or a title of a song, and be able to play the multimedia information on a multimedia device, either by selecting a multimedia device to play the content or having the brokering device automatically select the device, using technologies such as GPS which are capable of identifying the location of the user and the location of devices in the vicinity.

Then, the technical layer of the brokering device will perform the complex functions involved with managing the multimedia information. The present invention has two technical aspects. The first is the media format conversion functionality, known also as transcoding. The second is the set of protocols that allow content discovery, identification of the functions available in a given device. The functionality includes the ability to serve content, transform content using transcoding and control content, such as selecting the source and the destination of the content and connecting them together or rendering the content. Several protocols available to accomplish this include uPnP®, DLNA®, iTunes®, and Microsoft® protocols.

By separating the service and the technical layer, the brokering device configuration hides the complexity involved with managing the multimedia information. Therefore, a user who is not technically savvy is able to manage and play multimedia information between protocols and multimedia devices by making simple selections and not worrying about technical details.

The benefits of using the brokering device with the brokering service provider includes the ability to use one brokering device to manage multimedia information contained on multiple databases and on multiple sources, such as hardware, software, or the interne, without requiring the user to have knowledge of technical details to manage and play multimedia information. Additionally, to use the brokering service provider with the brokering service allows a user to seamlessly change the multimedia device playing the multimedia information. For example, the user may move between different rooms in a house or between a house and a car without missing a portion of the multimedia information, having to seek the multimedia information on different multimedia devices, or carry around a copy of the multimedia information.

As used herein, the term seek refers to jumping to a different offset or point in the same multimedia file. In the above example, the user does not even have to pause the multimedia file on the multimedia device in the car, such as an mp3 player, because the brokering device is tracking the location/offset and the second device, such as a home stereo, can just start playing at the tracked location/offset. An additional feature includes incorporating a sensor or a GPS device in the brokering device that can determine if a person is close to the home stereo in the above example and then automatically start playing the home stereo when the user enters the home. A further capability includes using the user discovery protocol 46 to configure and provide instructions for actions to automatically occur, depending on the media hand-off scenario.

With reference to FIG. 1, the brokering device 10 is connected to a brokering service provider 11 and the brokering device 10 communicates with a user 12, a plurality of multimedia devices 14, and a multimedia content file 16 using a network 18; and contains a discovery module 20. The network 18 contemplated includes small through large networks, examples are Personal Area Networks (PAN), Local Area Networks (LAN), and Wide Area Networks (WAN), such as the interne. The brokering device 10 enables the user 12 to configure a user profile 22 that contains information about the user and commonly used multimedia devices 14. Such information may be obtained from the user and from a database 48 containing user information, such as a record of the user's 12 previous activity.

The multimedia devices 14 contemplated include but are not limited to stereos, televisions, computers, digital media personal recorders and players, and mp3 players. The brokering device 10 is also able to obtain and store information in a multimedia device descriptor 24. Such information stored includes the device's protocol for the multimedia content files 16. The multimedia content file 16 may include, for example, mp3 songs, DVD movies, and any other multimedia information offered by a service provider, such as AT&T®, Netflix®, or Blockbuster®. Each multimedia content file 16 may also include a multimedia content descriptor 26 that contains information about the file such as the protocol, length of time, quality, or other attributes as specified, but not limited to standard representations, such as MPEG-7 and MPEG-21. The discovery module 20 obtains information from each of the user profile 22, the multimedia device descriptor 24, and the multimedia content descriptor 26.

Figure 2:
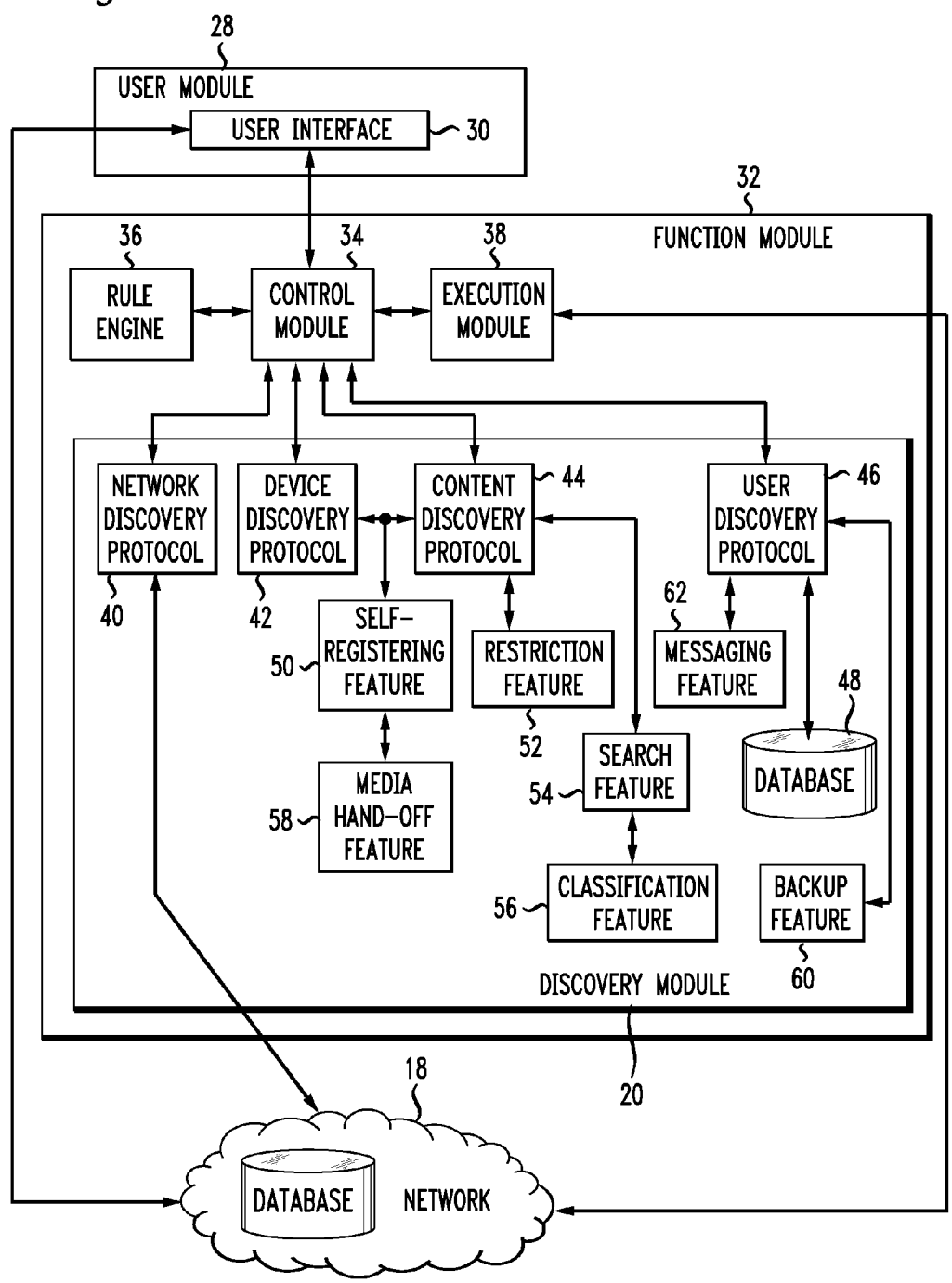
FIG. 2 depicts the architecture of the complexity broker.

FIG. 2 outlines the details of how the brokering device 10 works. The brokering device 10 contains two distinct layers. The first layer includes a user module 28 having a user interface 30 that enables a user to select the multimedia content file 16. The second layer includes a function module 32 having a control module 34 that communicates with the user module 28 and the discovery module 20. The function module 32 is designed to receive commands from the user module 28 and issues commands to the user module 28. The commands are then displayed on an interface device via the user module 28. The protocols included within the function module 32 include, for example, DLNA®, UPNP®, and MPPT. The control module 34 is designed to communicate information from the user module 28 and the function module 32 to the brokering service provider 11.

The control module 34 may also communicate with a rule engine 36 and an execution module 38 that can communicate with the network 18. The rule engine 36 applies user preferences, external policies, such as Digital Rights Management, which are dictated by the service provider, and/or internal policies, such as a parental restriction that restricts a particular multimedia device 14 from playing multimedia content files 16 rated "R." The execution module 38 takes the policies as a whole and identifies and executes the low level operations that need to be applied to implement the policy. For example, the execution module 38 will allow discovery of only a limited set of servers and/or multimedia information providers depending on the rules engine 36, such as preventing a particular multimedia device 14 from accessing multimedia content files 16 rated "R."

The discovery module 20 searches for various protocols and can also receive information from the network 18 regarding the protocols. The discovery module 20 has a self-registering feature 50 that is capable of retrieving information relating to a network discovery protocol 40, a device discovery protocol 42, a content discovery protocol 44, and a user discovery protocol 46. The discovery module 20 receives the protocols in the following manner: the network discovery protocol 40 communicates with the network 18; the device discovery protocol 42 obtains the information from the multimedia device descriptor 24; the content discovery protocol 44 obtains the information from the multimedia content descriptor 26; and the user discovery protocol 46 obtains the information from the network 18, the user profile 22 in a user database 48, or the user interface 30.

The self-registering feature 50 of the discovery module 20 allows the device discovery protocol 42 and the content discovery protocol 44 to intelligently and automatically match multimedia content files 16 and known multimedia devices 14. Within the discovery module 20 is a restriction feature 52 that determines if the multimedia content file 16 is legally obtained or obtainable. The restriction feature 52 is used to prevent the user 12 from using the brokering device 10 to illegally obtain multimedia content files 16.

Another embodiment of the present invention includes a search feature 54 that will enable the brokering device 10 to search for multimedia content files 16 between multiple storage locations, including hardware and software sources. The search feature 54 may also be designed to search for multimedia content files 16 using an internet search engine, a multimedia application and distribution system, such as iTunes®, or a subscription service, such as Rhapsody®. An additional feature of this embodiment may also include a classification feature 56 that will rate multimedia information available on hardware, software, or for purchase based on price, format, quality, providers, or other criteria. The classification feature 56 may be configured to determine the best multimedia information based on different criteria or provide the user interface 30 with a list of options and rating information and allow the user 12 to select the multimedia content file 16 from listed options.

A further embodiment of the brokering device 10 connected to the brokering service provider 11 includes a media hand-off feature 58, where, for example, the self-registering feature 50 allows for the playing, stopping and seeking of the multimedia content files 16 between multiple multimedia devices 14. For example, the user can watch a movie on an iPod® then continue viewing the movie to an HDTV in their home seamlessly using the user interface 30. An additional feature includes using the media hand-off feature 58 to prorate the cost of viewing the multimedia content file 16 on different multimedia devices 14 that have different protocols. Thus, if the user watches one-half of the movie on the iPod® and one-half of the movie on the HDTV they would pay for one-half at the iPod® rate and one-half at the HDTV rate.

Another feature of the present invention includes a backup feature 60 that provides a backup copy of multimedia content files 16 purchased by the user 12 in the user discovery protocol 46. The backup feature 60 may also include multimedia content descriptor 26 information, such as the time of purchase and the multimedia devices 14 capable of playing the multimedia content files 16.

A further feature of the present invention includes a messaging feature 62 to send messages across the network 18 from the user's profile 22. The messaging feature 62 would be configured similar to a social network and would allow users 12 to send messages concerning multimedia content files 16 including information about the quality of the multimedia content file 16 or information about multimedia services.

A still further embodiment of the present invention includes a multimedia player device 64 capable of using the brokering device 10 to play all multimedia content files 16 using the multimedia player device 64 instead of individual multimedia devices 14 for different protocols. The advantage of the multimedia player device 64 is the convenience that the user 12 only needs one multimedia device 14, the multimedia player device 64, to play all multimedia content files 16 and the multimedia player device 64 could include the brokering device 10 with the user interface 30.

The main advantage of using the broking device 10 with the brokering service provider 11 is the ability to provide a user friendly device that hides the complexity of associating multimedia content files 16 with multimedia devices 14. Another advantage is that the self-registering feature 50 enables the brokering device 10 to be intelligent and automated when matching multimedia content files 16 to multimedia devices 14, finding the least expensive provider of multimedia content files 16, and verifying the ability to obtain the multimedia content files 16 legally. In sum, the brokering device 10 with the brokering service provider 11 provides the user with a worry free approach to accessing multimedia content files 16 and makes it convenient and simple for a user to use multiple multimedia devices 14 with multiple multimedia content files 16 using the brokering device 10 to manages the multimedia content files 16 stored in hardware or software and streamed through the interne, such as podcasts.

Yet another advantage of using the brokering device 10 described above includes the ability to make dynamic adaption downstream because the brokering device 10 dynamically adapts to the hardware and software available on the network 18. This is possible because the brokering device 10 connected to the brokering service provider 11 is the single point of contact for sharing information between devices. This single point of contact with the self-register feature allows the brokering service provider 11 to be incorporated into the functionality of the brokering device 10. Incorporating the service provided by the brokering service provider 11 creates competition among multimedia content file 16 distributors.

A further advantage of portability is provided by the media hand-off feature 58, which would allow a person to access multimedia content files 16 using any network 18 and the ability to switch between different multimedia devices 14 seamlessly.

It will be appreciated that the present invention has been described herein with reference to certain preferred or exemplary embodiments. The preferred or exemplary embodiments described herein may be modified, changed, added to or deviated from without departing from the intent, spirit and scope of the present invention, and it is intended that all such additions, modifications, amendment and/or deviations be included within the scope of the following claims.

What is claimed is:

1. A brokering device to manage multimedia information, the brokering device comprising:
   an interface device configured to select a multimedia content file, the interface device being configured to provide the selected multimedia content file to a plurality of multimedia devices without requiring a user to specify a protocol associated with the selected multimedia content file;
   a control module including a processing device, the processing device configured to discover the selected multimedia content file on a network and provide a function to a multimedia device in compliance with a policy; and
   a rule engine that communicates with the control module to provide the policy, the policy comprising an internal policy or an external policy, the policy permitting discovery of only a predetermined limited set of multimedia content files.

2. The brokering device of claim 1, further comprising a discovery module to search for protocols, the discovery module operating in accordance with a network discovery protocol to communicate with the network, the discovery module operating in accordance with a device discovery protocol to obtain information from a multimedia device descriptor, the discovery module operating in accordance with a content discovery protocol to obtain information from a multimedia content descriptor, the discovery module operating in accordance with a user discovery protocol configured to communicate with a database and the network.

3. The brokering device of claim 2, wherein the discovery module further comprises a self-registering feature that enables the device discovery protocol and the content discovery protocol to match the selected multimedia content file in the multimedia device.

4. The brokering device of claim 3, wherein the self-registering feature further comprises a media hand-off feature enabling playing, stopping, and seeking of the selected multimedia content file and enabling payment at a prorated amount depending on an amount of time content is played on a multimedia device.

5. The brokering device of claim 2, wherein the content discovery protocol further comprises a search feature capable of searching multiple storage locations for the selected multimedia content file.

6. The brokering device of claim 5, wherein the search feature further comprises a classification feature to rate the selected multimedia content file based on information from a multimedia content descriptor including price, format, quality, and provider information.

7. The brokering device of claim 2, wherein the content discovery protocol further comprises a restriction feature, the restriction feature configured to use the content discovery protocol to determine legal rights associated with the selected multimedia content file.

8. The brokering device of claim 2, wherein the user discovery protocol further comprises a backup feature for storing multimedia content descriptor information and a copy of the selected multimedia content file.

9. The brokering device of claim 2, wherein the user discovery protocol further comprises a messaging feature enabling sending and receiving of messages across the network.

10. The brokering device of claim 1, further comprising an execution module that communicates with the control module and the network to identify and execute an operation being applied to implement the policy.

11. The brokering device of claim 1 further comprising a multimedia player device capable of playing the selected multimedia content file, wherein the selected multimedia content file includes more than one file format.

12. The brokering device of claim 1, wherein the policy comprises an internal policy or an external policy.

13. A system for managing multimedia information comprising:
   a brokering device to manage multimedia information, the brokering device including:
      an interface device operative to select a multimedia content file, the interface device being configured to provide the selected multimedia content file to a plurality of multimedia devices without requiring a user to specify a protocol associated with the selected multimedia content file;
      a control module including a processing device configured to discover the selected multimedia content file on a network and provide functions to a multimedia device in compliance with a policy; and
      a rule engine that communicates with the control module to provide the policy, the policy comprising an internal policy or an external policy, the policy permitting discovery only of a predetermined limited set of multimedia content files;
   and
   a multimedia device configured to play the selected multimedia content file.

14. The system of claim 13, wherein the brokering device further comprises:
   an execution module that communicates with the control module and the network to identify and execute an operation being applied to implement the policy;
   and
   a discovery module to search for protocols, the discovery module operating in accordance with a network discovery protocol for communicating with the network, the discovery module operating in accordance a content discovery protocol to obtain information from a multimedia content descriptor, the discovery module operating in accordance with a device discovery protocol to obtain information from a multimedia device descriptor, the discovery module operating in accordance with a user discovery protocol configured to communicate with a database and the network.

15. The system of claim 14, wherein the discovery module further comprises a self-registering feature that enables the device discovery protocol and the content discovery protocol to match the selected multimedia content file in the multimedia device, the self-registering feature including a media hand-off feature enabling playing, stopping, and seeking of the selected multimedia content file and enabling payment at a prorated amount depending on an amount of time content is played on the multimedia device.

16. The system of claim 14, wherein the content discovery protocol further comprises a restriction feature, the restriction feature configured to use the content discovery protocol to obtain information on legal rights associated with the selected multimedia content file, and a search feature to search multiple storage locations for the selected multimedia content file, the search feature including a classification feature to rate the selected multimedia content file based on information from a multimedia content descriptor including price, format, quality, and provider information.

17. The system of claim 14, wherein the user discovery protocol further comprises:
   a backup feature to store the multimedia content descriptor information and a copy of the selected multimedia content file; and
   a messaging feature configured to enable sending and receiving of messages across the network.

18. The system of claim 13, further comprising a multimedia player device capable of playing the selected multimedia content file, wherein the selected multimedia content file includes more than one file format.

19. The system of claim 13, wherein the policy comprises an internal policy or an external policy.

* * * * *